(12) United States Patent
Kajino

(10) Patent No.: US 11,824,469 B2
(45) Date of Patent: Nov. 21, 2023

(54) METHOD FOR SENSING ABNORMALITY OF PIEZOELECTRIC DRIVE DEVICE, PIEZOELECTRIC DRIVE DEVICE, AND ROBOT

(71) Applicant: SEIKO EPSON CORPORATION, Tokyo (JP)

(72) Inventor: Kiichi Kajino, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 113 days.

(21) Appl. No.: 17/534,472

(22) Filed: Nov. 24, 2021

(65) Prior Publication Data

US 2022/0166349 A1 May 26, 2022

(30) Foreign Application Priority Data

Nov. 25, 2020 (JP) ................................ 2020-195033

(51) Int. Cl.
*H02N 2/10* (2006.01)
*H02N 2/00* (2006.01)
(52) U.S. Cl.
CPC ............ *H02N 2/103* (2013.01); *H02N 2/004* (2013.01); *H02N 2/0075* (2013.01)

(58) Field of Classification Search
CPC ....... H02N 2/103; H02N 2/004; H02N 2/0075
See application file for complete search history.

(56) References Cited

U.S. PATENT DOCUMENTS

| | | | | |
|---|---|---|---|---|
| 6,608,427 B2* | 8/2003 | Akiyama | ............. | H10N 30/302 |
| | | | | 310/333 |
| 2003/0052628 A1 | 3/2003 | Kataoka | | |
| 2008/0198458 A1* | 8/2008 | Kashiyama | ........ | G02B 27/0006 |
| | | | | 359/508 |
| 2011/0254497 A1* | 10/2011 | Matsumoto | ............. | F03G 7/005 |
| | | | | 318/599 |
| 2020/0164637 A1* | 5/2020 | Takagi | ................. | B41J 2/04596 |

FOREIGN PATENT DOCUMENTS

| | | |
|---|---|---|
| JP | H01190269 A | 7/1989 |
| JP | 2003092891 A | 3/2003 |

* cited by examiner

*Primary Examiner* — Emily P Pham
(74) *Attorney, Agent, or Firm* — Gang Yu

(57) ABSTRACT

A method for sensing an abnormality of a piezoelectric drive device is a method for sensing a vibration abnormality of the piezoelectric drive device having a substrate and thin-film piezoelectric elements placed on the substrate and controlling amplitude of the piezoelectric elements using a drive control signal, and the method includes sensing the vibration abnormality by a drive voltage corresponding to the drive control signal.

7 Claims, 9 Drawing Sheets

FIG. 4
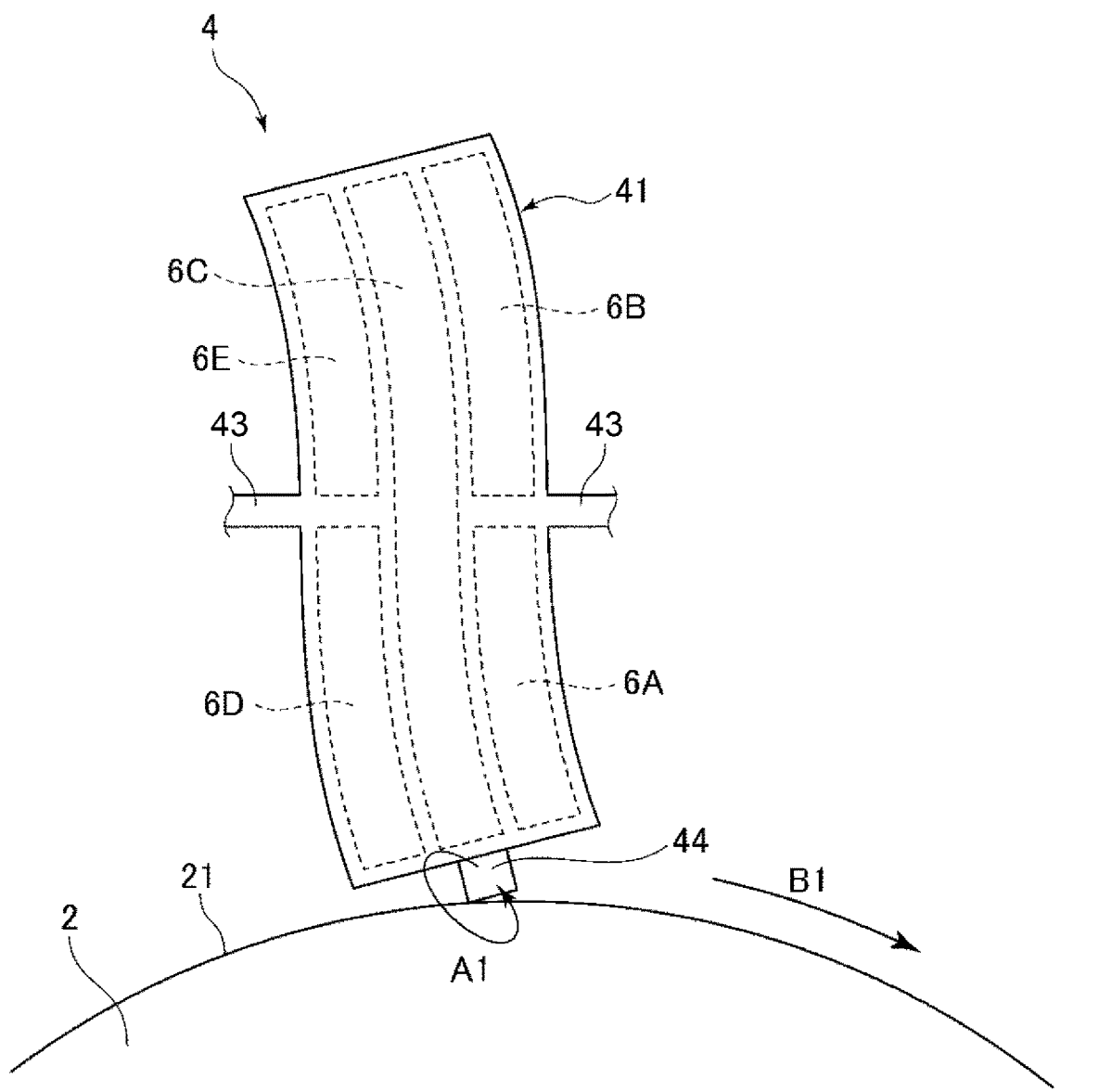
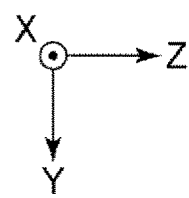

METHOD FOR SENSING ABNORMALITY OF PIEZOELECTRIC DRIVE DEVICE, PIEZOELECTRIC DRIVE DEVICE, AND ROBOT

The present application is based on, and claims priority from JP Application Serial Number 2020-195033, filed Nov. 25, 2020, the disclosure of which is hereby incorporated by reference herein in its entirety.

BACKGROUND

1. Technical Field

The present disclosure relates to a method for sensing an abnormality of a piezoelectric drive device, a piezoelectric drive device, and a robot.

2. Related Art

Recently, piezoelectric motors using vibration of piezoelectric materials have been developed. As the piezoelectric motor, for example, JP-A-1-190269 discloses an ultrasonic motor including a monitor electrode provided in a part to which an input voltage of the piezoelectric material is not applied and monitoring a voltage generated by vibration of the piezoelectric material, and a protection device that evaluates the monitored voltage and senses an abnormality and, when sensing an abnormality, avoids damage on the ultrasonic motor by e.g. warning or stopping of the motor.

However, the ultrasonic motor disclosed in JP-A-1-190269 requires the monitor electrode and the protection device having an abnormality sensing circuit and a protection circuit for sensing an abnormality and protecting, and there is a problem that cost reduction is difficult.

SUMMARY

A method for sensing an abnormality of a piezoelectric drive device is a method for sensing a vibration abnormality of the piezoelectric drive device having a substrate and a thin-film piezoelectric element placed on the substrate and controlling amplitude of the piezoelectric element using a drive control signal, and the method includes sensing the vibration abnormality by a drive voltage corresponding to the drive control signal.

A piezoelectric drive device includes a substrate, a thin-film piezoelectric element placed on the substrate, a circuit section outputting a drive control signal and controlling amplitude of the piezoelectric element, and a sensing portion sensing a vibration abnormality by a drive voltage generated by the drive control signal.

A robot includes a piezoelectric motor having the above described piezoelectric drive device.

BRIEF DESCRIPTION OF THE DRAWINGS

FIG. 4 is a plan view showing a drive state of the piezoelectric motor.

DESCRIPTION OF EXEMPLARY EMBODIMENTS

1. First Embodiment

First, a piezoelectric drive device 3 according to a first embodiment will be explained using a piezoelectric motor 1 including the piezoelectric drive device 3 as an example with reference to FIGS. 1 to 5.

For convenience of explanation, in the respective drawings, an X-axis, a Y-axis, and a Z-axis are shown as three axes orthogonal to one another. Further, directions along the X-axis are referred to as "X directions", directions along the Y-axis are referred to as "Y directions", and directions along the Z-axis are referred to as "Z directions". Furthermore, the arrow-head sides of the respective axes are also referred to as "plus sides", the opposite sides to the arrow-heads are also referred to as "minus sides", the plus side in the X direction is also referred to as "upper", and the minus side in the X direction is also referred to as "lower".

Figure 1:
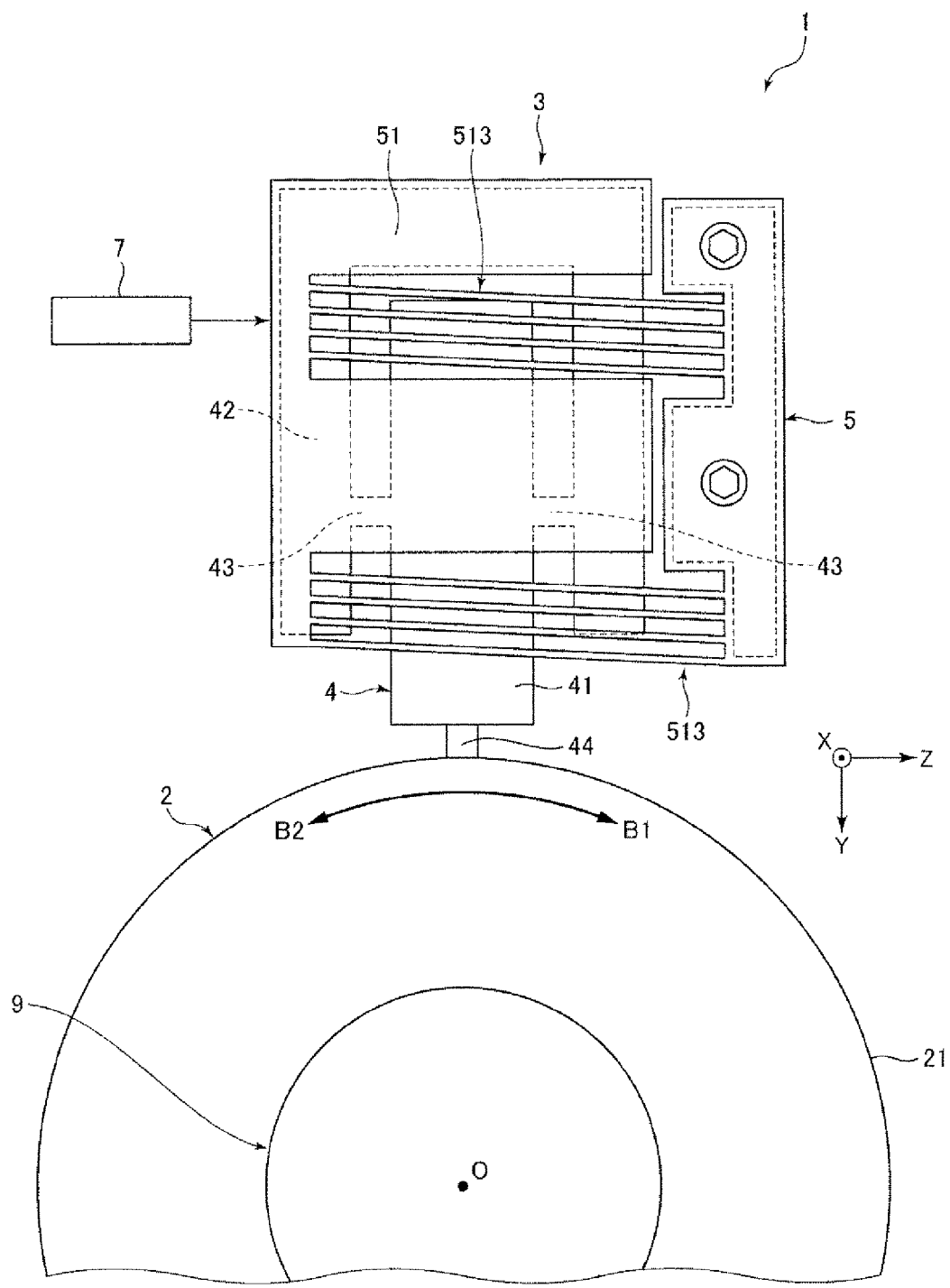
FIG. 1 is a plan view showing a schematic configuration of a piezoelectric motor including a piezoelectric drive device according to a first embodiment.

As shown in FIG. 1, the piezoelectric motor 1 has a rotor 2 in a disk shape as a driven member rotatable around a center axis O thereof, and the piezoelectric drive device 3 in contact with an outer circumferential surface 21 of the rotor 2 and rotating the rotor 2 around the center axis O. The piezoelectric motor 1 has a piezoelectric actuator 4, an urging member 5 urging the piezoelectric actuator 4 toward the rotor 2, and a controller 7 controlling driving of the piezoelectric actuator 4. In the piezoelectric motor 1, when the piezoelectric actuator 4 flexurally vibrates, the vibration is transmitted to the rotor 2 and the rotor 2 rotates around the center axis O clockwise as shown by an arrow B1 or counterclockwise as shown by an arrow B2.

Further, in the embodiment, an encoder 9 is provided in the rotor 2 and behavior, particularly, a rotation amount and an angular velocity of the rotor 2 may be detected by the encoder 9.

Figure 2:
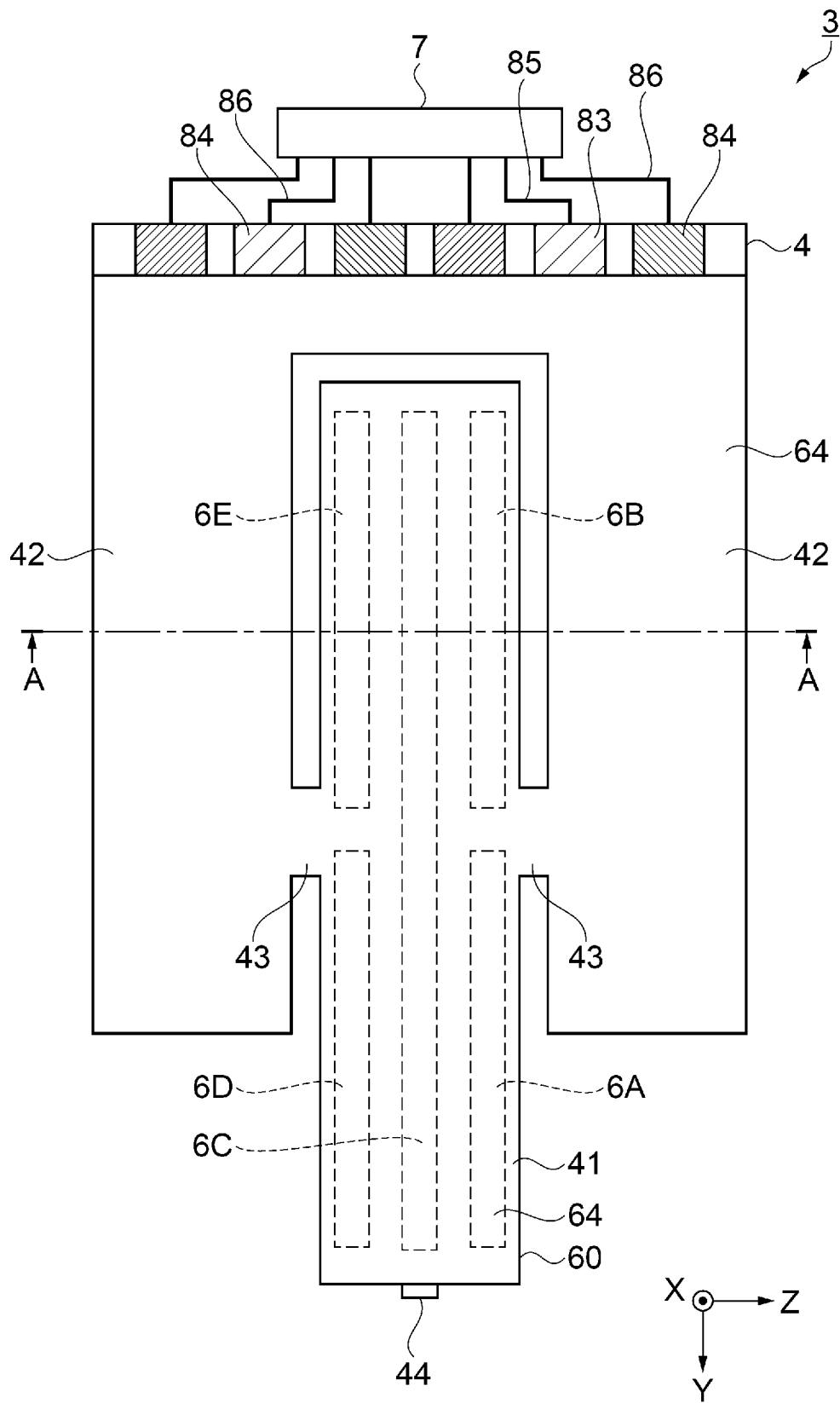
FIG. 2 is a plan view showing a schematic configuration of the piezoelectric drive device according to the first embodiment.

As shown in FIG. 2, the piezoelectric actuator 4 has a vibrator 41, supporting portions 42 supporting the vibrator 41, coupling portions 43 coupling the vibrator 41 and the supporting portions 42, and a convex portion 44 coupled to the vibrator 41 and transmitting vibration of the vibrator 41 to the rotor 2.

The vibrator 41 has a plate-like shape having a thickness in the X directions and spreading on the YZ-plane containing the Y-axis and the Z-axis, and flexurally vibrates in S shapes by bending in the Z directions while expanding and contracting in the Y directions. Further, the vibrator 41 has a rectangular shape elongated in the Y directions as the expansion and contraction directions in a plan view from the X direction.

The vibrator 41 has a substrate 60 and five piezoelectric elements 6A to 6E placed on the substrate 60 for flexurally vibrating the vibrator 41.

The piezoelectric element 6C is placed in the center part in the Z directions of the vibrator 41 along the Y directions as the longitudinal directions of the vibrator 41. At the plus side in the Z direction of the vibrator 41 with respect to the piezoelectric element 6C, the piezoelectric element 6A and the piezoelectric element 6B are placed side by side in the Y directions of the vibrator 41 and, at the minus side in the Z direction, the piezoelectric element 6D and the piezoelectric element 6E are placed side by side in the Y directions of the vibrator 41. These piezoelectric elements 6A to 6E respectively expand and contract in the Y directions of the vibrator 41 by energization. The piezoelectric element 6A and the piezoelectric element 6E are electrically coupled to each other and the piezoelectric element 6B and the piezoelectric element 6D are electrically coupled to each other.

Drive voltages V (alternating-current voltages) at the same frequency with different phases are respectively applied to the piezoelectric elements 6A, 6E, the piezoelectric element 6C, and the piezoelectric elements 6B, 6D to shift the expansion and contraction times of the elements, and thereby, the vibrator 41 may be flexurally vibrated in S shapes within the plane.

Figure 3:
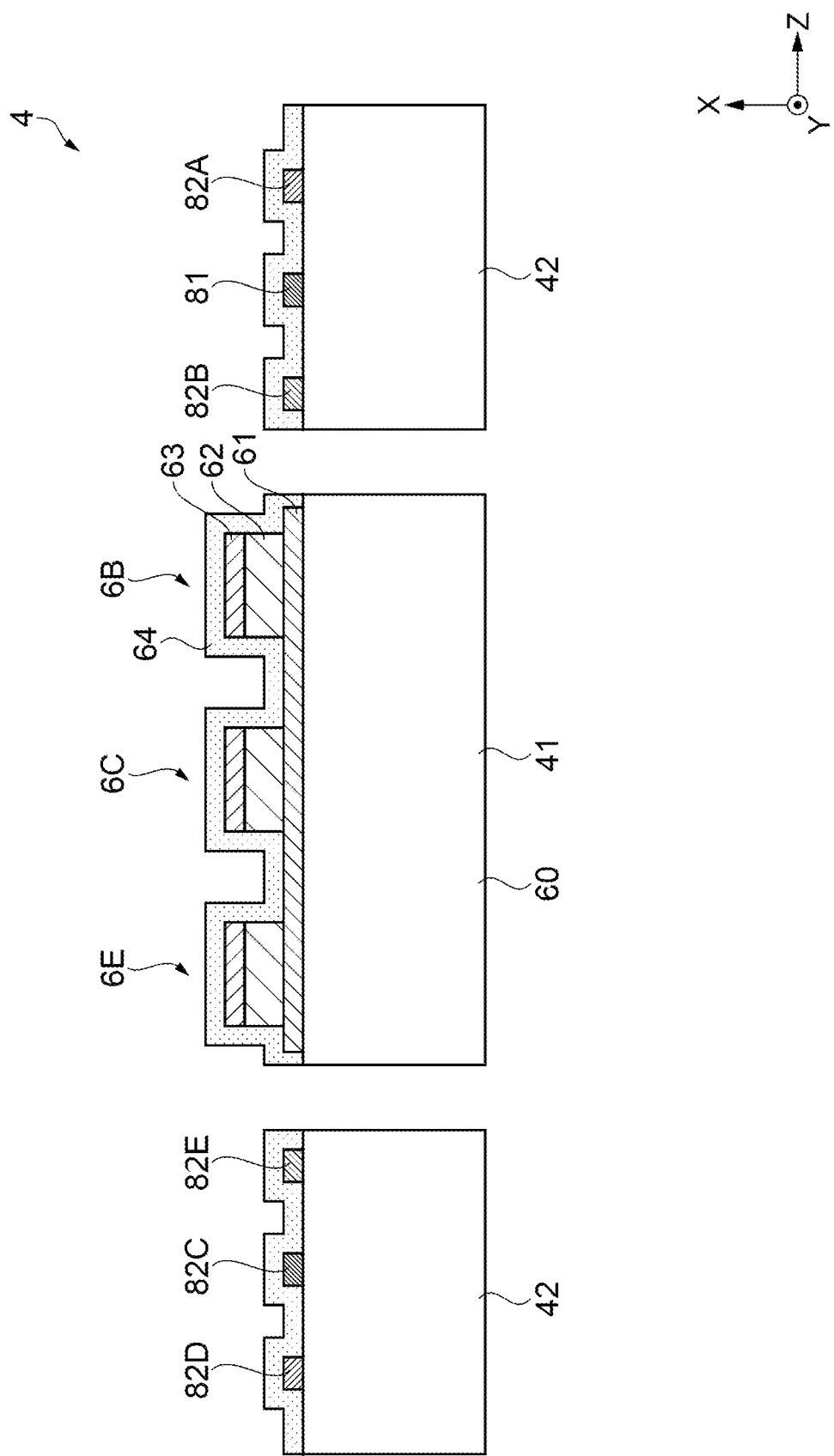
FIG. 3 is a sectional view along line A-A in FIG. 2.

As shown in FIG. 3, each of the piezoelectric elements 6A to 6E has a first electrode 61 placed on the substrate 60, a piezoelectric material 62 placed on the first electrode 61, and a second electrode 63 placed on the piezoelectric material 62. Note that an insulating layer 64 for preventing short circuit between the electrodes is provided on the second electrode 63. The first electrode 61 of the piezoelectric elements 6A to 6E is a common electrode and the piezoelectric materials 62 and the second electrodes 63 are respectively individually provided in the piezoelectric elements 6A to 6E. The second electrodes 63 are drive electrodes for vibrating the respective piezoelectric materials 62 of the piezoelectric elements 6A to 6E based on a drive control signal Vx.

The thickness of the piezoelectric material 62 is not particularly limited, but preferably from 50 nm to 20 μm and more preferably from 0.5 μm to 7 μm, for example. Accordingly, the piezoelectric elements 6A to 6E are thin-film piezoelectric elements. Note that, when the thickness of the piezoelectric material 62 is smaller than 50 nm, piezoelectric breakdown is prone to occur and the drive voltage V is hard to be higher, and output of the piezoelectric actuator 4 is smaller by the lower drive voltage. On the other hand, when the thickness of the piezoelectric material 62 is larger than 20 μm, cracking is highly likely to occur in the piezoelectric material 62 and the drive voltage V may be higher.

The constituent material of the piezoelectric material 62 is not particularly limited, but piezoelectric ceramics including e.g. lead zirconate titanate (PZT), barium titanate, lead titanate, potassium niobate, lithium niobate, lithium tantalate, sodium tungstate, zinc oxide, barium strontium titanate (BST), strontium bismuth tantalate (SBT), lead metaniobate, and lead scandium niobate may be used. As the piezoelectric material 62, not only the above described piezoelectric ceramics but also polyvinylidene fluoride, quartz crystal, or the like may be used.

The method of forming the piezoelectric material 62 is not particularly limited, but the material may be formed using the sol-gel method or sputtering method. The piezoelectric material 62 of the embodiment is a thin film formed using the sol-gel method. Therefore, the thin-film piezoelectric elements 6A to 6E are placed on the substrate 60. Thereby, the thinner piezoelectric materials 62 than those formed from e.g. a bulk material may be obtained, the piezoelectric elements 6A to 6E having larger capacity C may be obtained, and further, the thickness of the piezoelectric drive device 3 may be reduced.

The supporting portions 42 support the vibrator 41 via the coupling portions 43. The supporting portions 42 have a U-shape surrounding the minus side in the Y direction of the vibrator 41 in the plan view from the X direction. The coupling portions 43 couple a part as a node of the flexural vibration of the vibrator 41, specifically, the center part in the Y directions of the vibrator 41 and the supporting portions 42.

On the supporting portions 42 and the coupling portions 43, one common electrode wire 81 and five drive electrode wires 82A, 82B, 82C, 82D, 82E are provided. Further, on the end parts at the minus side in the Y direction of the supporting portions 42, one common electrode terminal 83 and five drive electrode terminals 84 are placed side by side along the Z directions.

One end of the common electrode wire 81 is electrically coupled to the first electrode 61 of the piezoelectric elements 6A to 6E and the other end of the common electrode wire 81 is electrically coupled to the common electrode terminal 83. One ends of the five drive electrode wires 82A, 82B, 82C, 82D, 82E are electrically coupled to the second electrodes 63 of the piezoelectric elements 6A, 6B, 6C, 6D, 6E, respectively, and the other ends of the five drive electrode wires 82A, 82B, 82C, 82D, 82E are electrically coupled to the drive electrode terminals 84, respectively.

The common electrode terminal 83 electrically coupled to the first electrode 61 of the piezoelectric elements 6A to 6E is electrically coupled to the controller 7 via an external wire 85 and grounded to GND. Further, the five drive electrode terminals 84 electrically coupled to the second electrodes 63 of the piezoelectric elements 6A to 6E are electrically coupled to the controller 7 via external wires 86.

The convex portion 44 is provided in the distal end part of the vibrator 41 and projects from the vibrator 41 toward the plus side in the Y direction. The distal end part of the convex portion 44 is in contact with the outer circumferential surface 21 of the rotor 2. Accordingly, the vibration of the vibrator 41 is transmitted to the rotor 2 via the convex portion 44.

When the drive voltage V at phase 0° is applied to the piezoelectric elements 6A, 6E, the drive voltage V with a phase shift of 90° is applied to the piezoelectric element 6C, and the drive voltage V with a phase shift of 180° is applied to the piezoelectric elements 6B, 6D, the piezoelectric elements 6A, 6E deform toward the outside of the vibrator 41 and the piezoelectric elements 6B, 6D deform toward the inside of the vibrator 41. Reversely, when the piezoelectric elements 6A, 6E deform toward the inside of the vibrator 41 and the piezoelectric elements 6B, 6D deform toward the outside of the vibrator 41. Accordingly, the vibrator 41 is displaced in the Z directions in S shapes. Further, the piezoelectric element 6C stretchingly vibrates in the Y directions. Therefore, as shown in FIG. 4, the vibrator 41 stretchingly vibrates in the Y directions and flexurally vibrates in the S-shapes in the Z directions, these vibrations are synthesized, and the distal end of the convex portion 44 makes elliptic motion (rotational motion) tracing an elliptic trajectory counterclockwise as shown by an arrow A1. The rotor 2 is turned around by the elliptic motion of the convex portion 44, and the rotor 2 rotates clockwise as shown by the arrow B1.

Note that, in the embodiment, the rotor 2 is driven by the elliptic motion of the distal end of the convex portion 44 using the flexural vibration and the stretching vibration as in-plane vibrations that displace the vibrator 41 within the YZ-plane, however, the rotor 2 may be driven by elliptic motion of the distal end of the convex portion 44 using vibration as out-of-plane vibration that displaces the vibrator 41 out of the YZ-plane.

Figure 5:
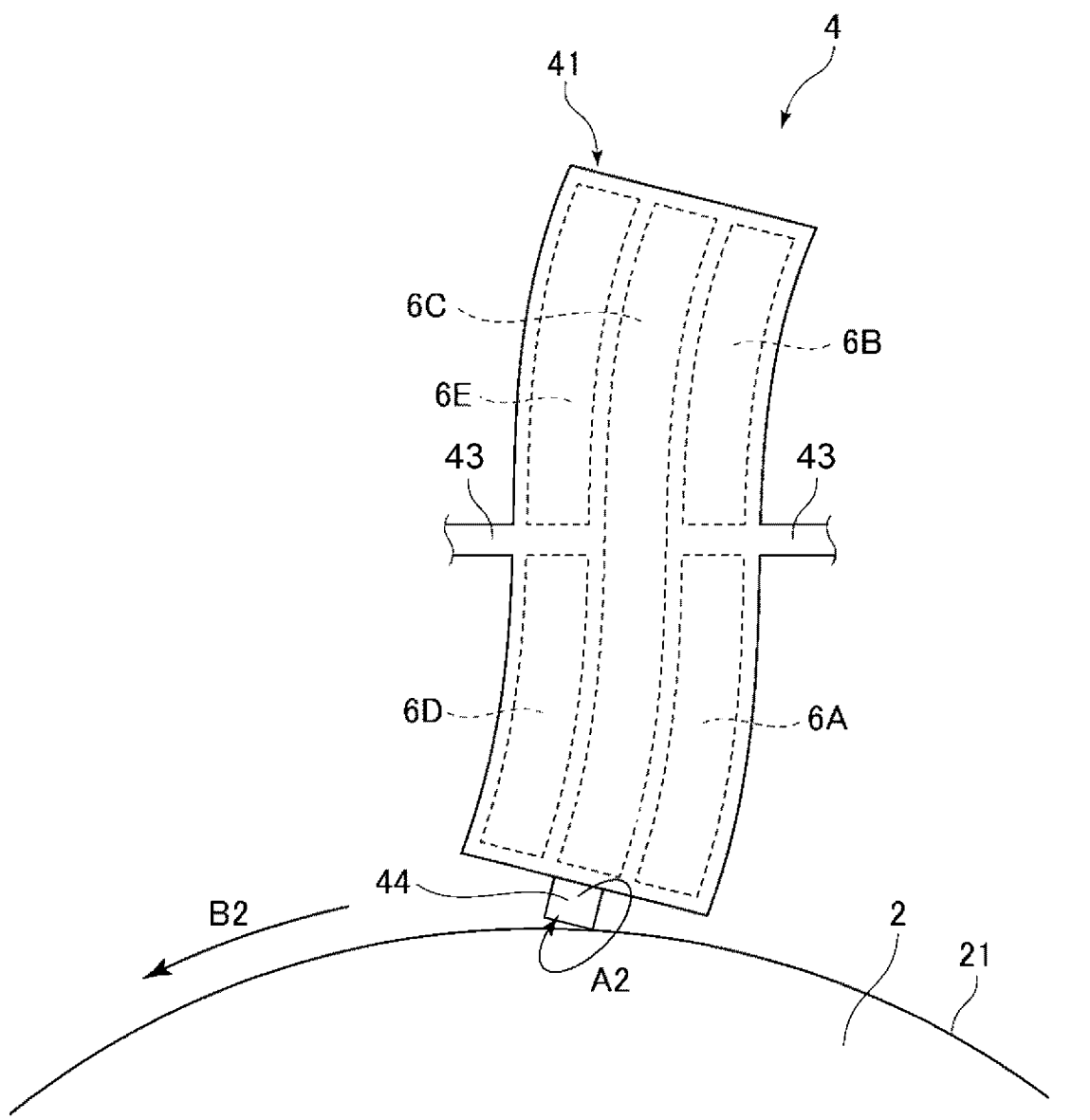
FIG. 5 is a plan view showing a drive state of the piezoelectric motor.

When the drive voltages V applied to the piezoelectric elements 6A, 6E and the piezoelectric elements 6B, 6D are switched, that is, the drive voltage V at phase 0° is applied to the piezoelectric elements 6B, 6D, the drive voltage V with a phase shift of 90° is applied to the piezoelectric element 6C, and the drive voltage V with a phase shift of 180° is applied to the piezoelectric elements 6A, 6E, as shown in FIG. 5, the vibrator 41 stretchingly vibrates in the Y directions and flexurally vibrates in the S-shapes in the Z directions, these vibrations are synthesized, and the convex portion 44 makes elliptic motion clockwise as shown by an arrow A2. The rotor 2 is turned around by the elliptic motion of the convex portion 44, and the rotor 2 rotates counter-clockwise as shown by the arrow B2.

The urging member 5 is a member that urges the convex portion 44 toward the circumferential surface 21 of the rotor 2. The urging member 5 is fixed to a housing or the like with spring portions 513 provided in a base portion 51 supporting the piezoelectric actuator 4 flexed in the Y directions, and thereby, the convex portion 44 may be urged toward the circumferential surface 21 of the rotor 2 using a restoring force of the spring portions 513.

The controller 7 applies the drive voltages V as the alternating-current voltages to the piezoelectric elements 6A to 6E, and thereby, controls driving of the piezoelectric actuator 4.

Further, the controller 7 has a function of sensing a vibration abnormality of the piezoelectric elements 6A to 6E by the drive voltage V corresponding to the drive control signal Vx.

Next, a circuit and a method for sensing the vibration abnormality of the piezoelectric elements 6A to 6E in the controller 7 will be explained with reference to FIGS. 6 to 9.

Figure 6:
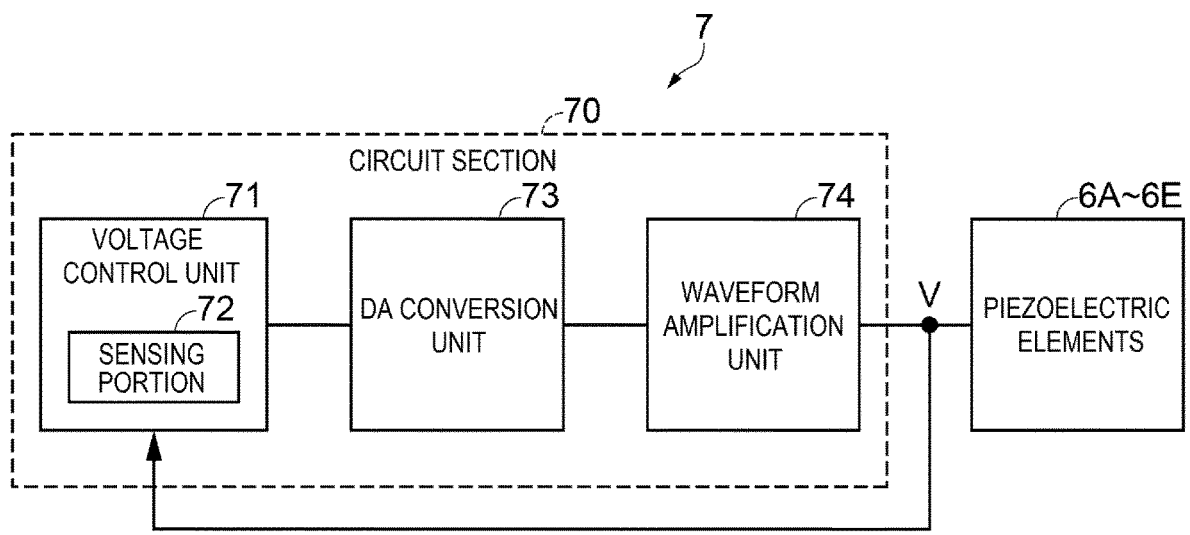
FIG. 6 is a block diagram showing a configuration of an abnormality sensing circuit.

The controller 7 has a circuit section 70 that outputs the drive control signal Vx, controls amplitude of the piezoelectric elements 6A to 6E, and senses the vibration abnormality of the piezoelectric elements 6A to 6E. As shown in FIG. 6, the circuit section 70 includes a voltage control unit 71 having a sensing portion 72 that senses the vibration abnormality of the piezoelectric elements 6A to 6E, a DA conversion unit 73, and a waveform amplification unit 74.

The voltage control unit 71 outputs the drive control signal Vx for controlling the amplitude of the piezoelectric elements 6A to 6E and determines amplitude of the drive voltage V in the waveform amplification unit 74. Note that the drive control signal Vx is a PWM (Pulse Width Modulation) width. The PVVM width is a signal modulated by changing of the duty ratio of pulse wave. A simple circuit configuration may be formed using the PWM width.

The sensing portion 72 senses the vibration abnormality of the piezoelectric elements 6A to 6E by comparing the drive voltage V as a voltage signal generated in the circuit section 70 and a drive voltage V as a real drive waveform. Note that the sensing portion 72 may be formed using software and a new circuit dedicated for abnormality sensing is unnecessary.

The DA conversion unit 73 converts rectangular pulse output from the voltage control unit 71 into an analog waveform.

The waveform amplification unit 74 amplifies the analog waveform converted by the DA conversion unit 73 based on the drive control signal Vx, generates the drive voltage V applied to the piezoelectric elements 6A to 6E, and controls the amplitude of the piezoelectric elements 6A to 6E.

Figure 7:
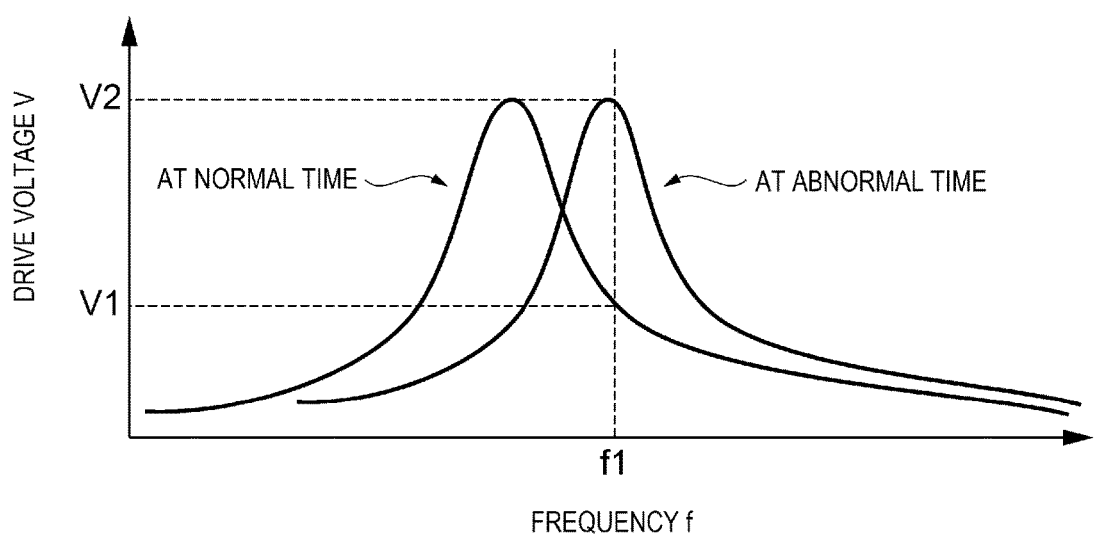
FIG. 7 shows frequency characteristics of a piezoelectric element.

The circuit section 70 coupled to the piezoelectric elements 6A to 6E has frequency characteristics as shown in FIG. 7 when the drive control signal Vx is constant. When the piezoelectric elements 6A to 6E are normally driven, a drive voltage V1 is generated at a drive frequency f1. On the other hand, when an abnormality that the capacity C is lower occurs in the piezoelectric elements 6A to 6E, the frequency characteristics change, and the drive voltage increases to a drive voltage V2 at the drive frequency f1. Accordingly, the drive voltage V1 at the normal time and the drive voltage V2 at the abnormal time are compared by the sensing portion 72, and thereby, the vibration abnormality of the piezoelectric elements 6A to 6E may be sensed. Therefore, when the drive voltage V corresponding to the drive control signal Vx is different from an assumed value Vs by a specific value or more, an abnormality is determined. Further, when the vibration abnormality is sensed, the abnormality is reported.

Here, the drive frequency f1 is determined by the following expression (1) by an inductor L of the DA conversion unit 73 and the capacity C of the piezoelectric elements 6A to 6E.

$$f1 = 1/(2\pi(LC)^{1/2}) \qquad (1)$$

The piezoelectric elements 6A to 6E of the embodiment are formed using thin films, and the capacity C may be made larger than that of the bulk. In a case of the bulk, the capacity C is smaller and it is necessary to add another capacitor in parallel for capacity adjustment. As the ratio of the added capacitor to the capacity C of the piezoelectric elements 6A to 6E increases, the resonance frequency changes more gently relative to the capacity changes of the piezoelectric elements 6A to 6E and the voltage change becomes smaller. Accordingly, the piezoelectric elements 6A to 6E of the embodiment are formed using thin films, and thereby, the voltage change relative to the capacity changes of the piezoelectric elements 6A to 6E is increased and sensing accuracy of the vibration abnormality of the piezoelectric elements 6A to 6E is improved.

Figure 8:
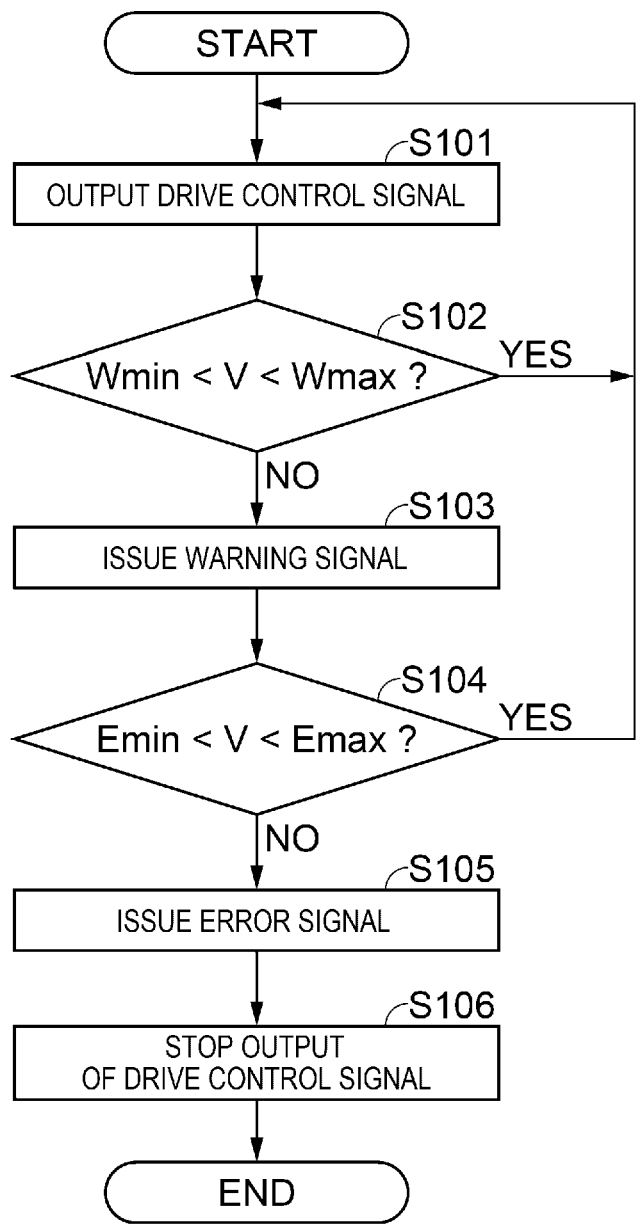
FIG. 8 is a flowchart showing a method of sensing an abnormality of the piezoelectric element.

In the method of sensing the vibration abnormality of the piezoelectric elements 6A to 6E in the controller 7, as shown in FIG. 8, first, at step S101, the drive control signal Vx is output from the voltage control unit 71 and the piezoelectric elements 6A to 6E are driven.

Figure 9:
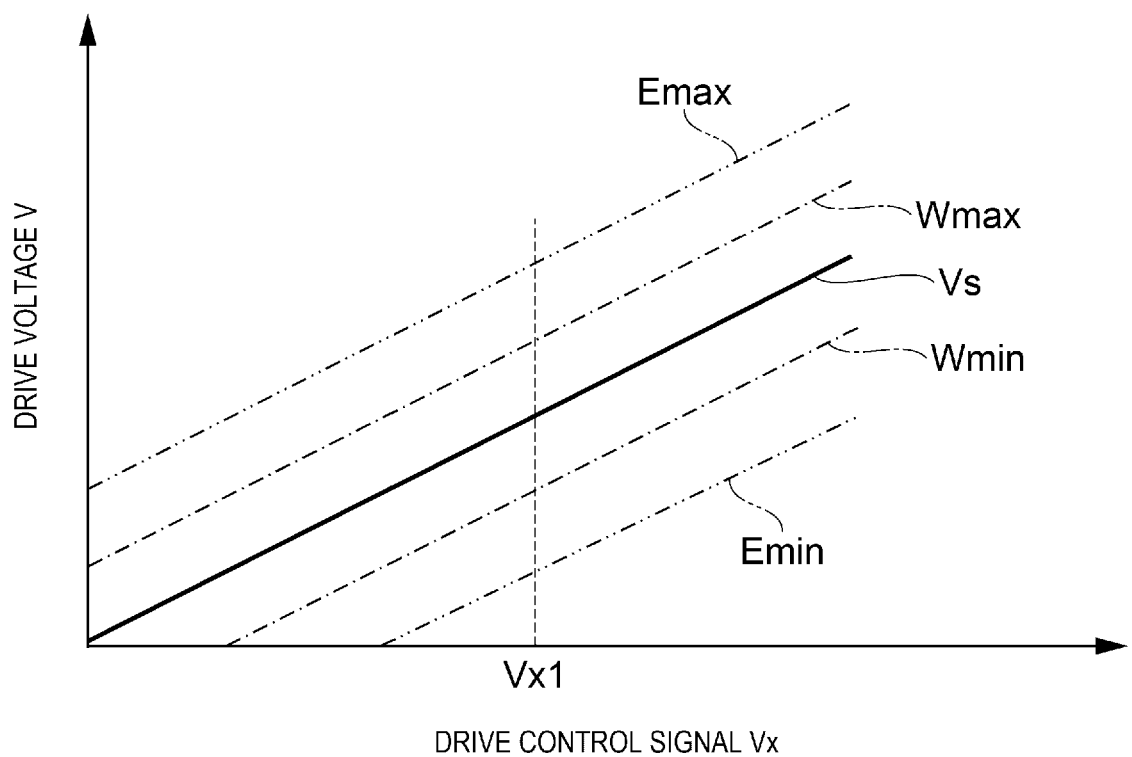
FIG. 9 shows drive voltage characteristics for determination of an abnormality of the piezoelectric element.

Then, at step S102, whether or not the drive voltage V output from the waveform amplification unit 74 as the assumed value Vs is different by the specific value or more is determined by the sensing portion 72. That is, as shown in FIG. 9, for example, at a drive control signal Vx1, whether the assumed value Vs is larger than a warning lower limit Wmin or smaller than a warning upper limit Wmax is determined. When the assumed value Vs is within a range from the warning lower limit Wmin to the warning upper limit Wmax, normality is determined as "Yes", the process returns to step S101, the drive control signal Vx is output, and the piezoelectric elements 6A to 6E are driven. When the assumed value Vs is out of the range from the warning lower limit Wmin to the warning upper limit Wmax, an abnormality is determined as "No", the process goes to step S103, a warning signal is issued, and a vibration abnormality is reported to the outside.

Then, at step S104, whether or not the drive voltage V output from the waveform amplification unit 74 as the assumed value Vs is different by the specific value or more is determined by the sensing portion 72. That is, as shown in FIG. 9, for example, at the drive control signal Vx1, whether the assumed value Vs is larger than an error lower limit Emin or smaller than an error upper limit Emax is determined by the sensing portion 72. When the assumed value Vs is within a range from the error lower limit Emin to the error upper limit Emax, normality is determined as "Yes", the process returns to step S101, the drive control signal Vx is output, and the piezoelectric elements 6A to 6E are driven. When the assumed value Vs is out of the range from the error lower limit Emin to the error upper limit Emax, an abnormality is determined as "No", the process goes to step S105, an error signal is issued, and a vibration abnormality is reported to the outside. Note that the specific value in the embodiment is one of the warning lower limit Wmin, the warning upper limit Wmax, the error lower limit Emin, and the error upper limit Emax.

Then, at step S106, the output of the drive control signal Vx by the voltage control unit 71 is stopped, and further, the piezoelectric drive device 3 is stopped.

According to the above described piezoelectric drive device 3 and the method for sensing an abnormality of the piezoelectric drive device 3, the controller 7 in which the sensing portion 72 sensing the vibration abnormality of the piezoelectric elements 6A to 6E by the drive voltage V corresponding to the drive control signal Vx is formed using software is provided, and the vibration abnormality of the piezoelectric elements 6A to 6E may be sensed at lower cost without a new circuit dedicated for abnormality sensing. Further, damage on the piezoelectric motor 1 caused by the vibration abnormality of the piezoelectric elements 6A to 6E may be avoided.

2. Second Embodiment

Next, a robot 1000 including the piezoelectric drive device 3 according to a second embodiment will be explained with reference to FIG. 10. In the following description, a configuration to which the piezoelectric motor 1 including the piezoelectric drive device 3 is applied will be explained as an example.

Figure 10:
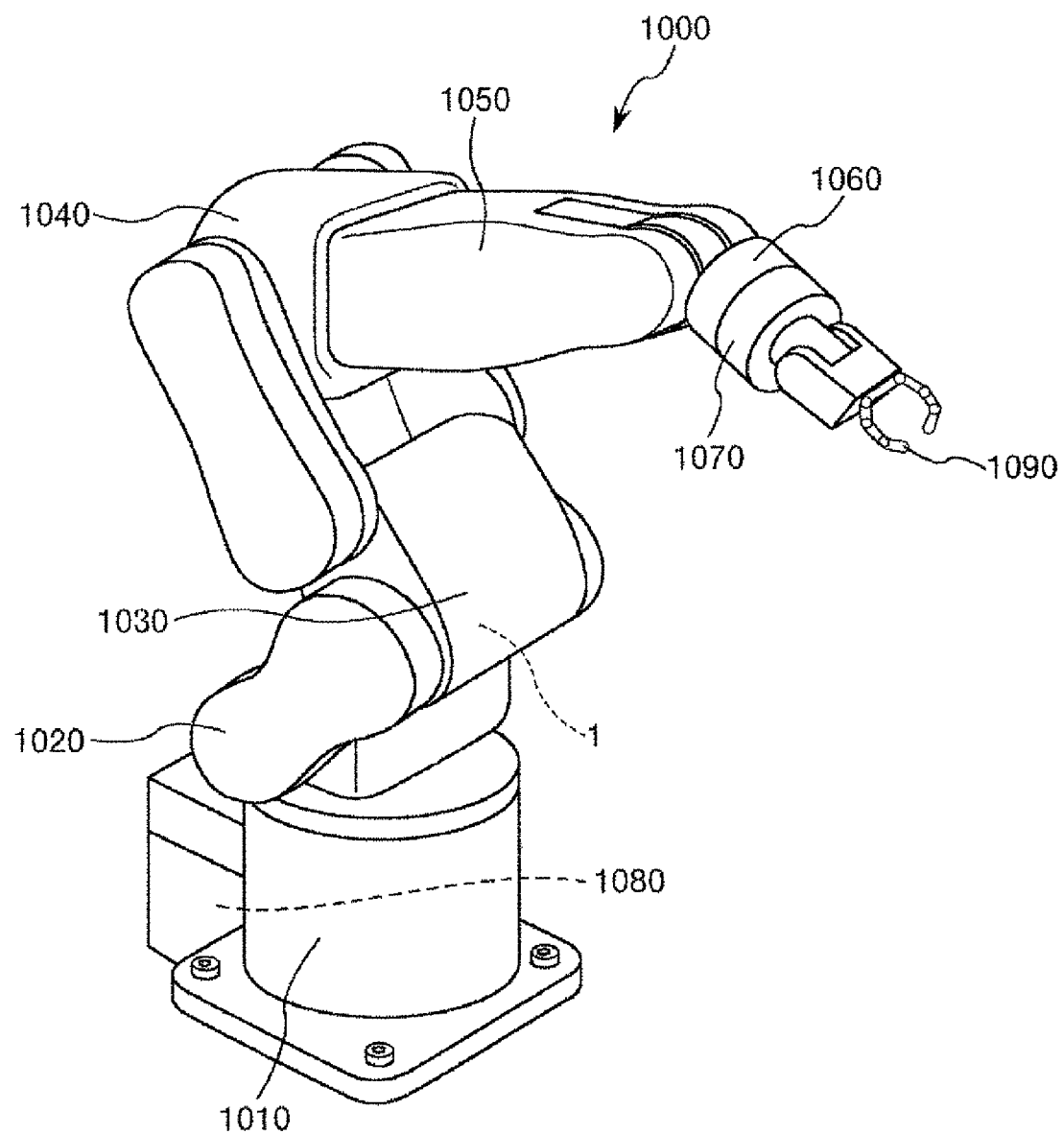
FIG. 10 is a perspective view showing a schematic configuration of a robot including a piezoelectric drive device according to a second embodiment.

As shown in FIG. 10, the robot 1000 may perform work of feeding, removing, transport, assembly, etc. of precision apparatuses and components forming the apparatuses. The robot 1000 is a six-axis robot and has a base 1010 fixed to a floor or a ceiling, an arm 1020 pivotably coupled to the base 1010, an arm 1030 pivotably coupled to the arm 1020, an arm 1040 pivotably coupled to the arm 1030, an arm 1050 pivotably coupled to the arm 1040, an arm 1060 pivotably coupled to the arm 1050, an arm 1070 pivotably coupled to the arm 1060, and a control apparatus 1080 that controls driving of these arms 1020, 1030, 1040, 1050, 1060, 1070.

Further, a hand coupling portion is provided in the arm 1070, and an end effector 1090 according to work to be executed by the robot 1000 is attached to the hand coupling portion. Furthermore, the piezoelectric motors 1 are provided in part or all of the respective joint portions and the respective arms 1020, 1030, 1040, 1050, 1060, 1070 pivot by driving of the piezoelectric motors 1. Note that the piezoelectric motor 1 may be provided in the end effector 1090 and used for driving of the end effector 1090.

The control apparatus 1080 includes a computer having e.g. a processor (CPU), a memory, an I/F (interface), etc. The processor controls driving of the respective parts of the robot 1000 by executing a predetermined program stored in the memory. Note that the program may be downloaded from an external server via the I/F. Further, all or part of the configuration of the control apparatus 1080 may be provided outside of the robot 1000 and coupled via a communication network such as a LAN (local area network).

The robot 1000 includes the piezoelectric motor 1 as described above. That is, the robot 1000 has the piezoelectric drive device 3 including the piezoelectric actuator 4 and the controller 7 that controls the vibration of the piezoelectric actuator 4, and driving the rotor 2 in contact with the piezoelectric actuator 4 by vibrating the piezoelectric actuator 4. The controller 7 has the sensing portion 72 formed using software and sensing the vibration abnormality of the piezoelectric elements 6A to 6E. Accordingly, when the vibration abnormality of the piezoelectric elements 6A to 6E is sensed, the piezoelectric drive device 3 etc. are stopped, and the damage on the piezoelectric motor 1 may be avoided. As a result, the robot 1000 having higher reliability and higher performance may be obtained.

What is claimed is:

1. A method for sensing an abnormality of a piezoelectric drive device for sensing a vibration abnormality of a piezoelectric drive device having a substrate and a thin-film piezoelectric element placed on the substrate and controlling vibration amplitude of the piezoelectric element using a drive control signal, the method comprising sensing the vibration abnormality by a drive voltage corresponding to the drive control signal, wherein the piezoelectric drive device has a waveform amplification unit, and an abnormality is determined when the drive voltage corresponding to the drive control signal is different from the drive voltage output from the waveform amplification unit by a specific value.

2. The method for sensing the abnormality of the piezoelectric drive device according to claim 1, wherein a thickness of the thin film of the piezoelectric element is from 50 nm to 20 μm.

3. The method for sensing the abnormality of the piezoelectric drive device according to claim 1, wherein the drive control signal is controlled by PWM.

4. The method for sensing the abnormality of the piezoelectric drive device according to claim 1, wherein when the vibration abnormality is sensed, the vibration abnormality is reported to the outside.

5. A piezoelectric drive device comprising:

a substrate;

a thin-film piezoelectric element placed on the substrate;

a circuit section outputting a drive control signal and controlling vibration amplitude of the piezoelectric element using the drive control signal; and a sensing portion sensing a vibration abnormality by a drive voltage generated by the drive control signal, wherein the piezoelectric drive device further comprising a waveform amplification unit, and an abnormality is determined when the drive voltage corresponding to the drive control signal is different from the drive voltage output from the waveform amplification unit by a specific value.

6. The piezoelectric drive device according to claim 5, wherein a thickness of the thin film of the piezoelectric element is from 50 nm to 20 μm.

7. A robot comprising a piezoelectric motor having the piezoelectric drive device according to claim 5.

* * * * *